UNITED STATES PATENT OFFICE.

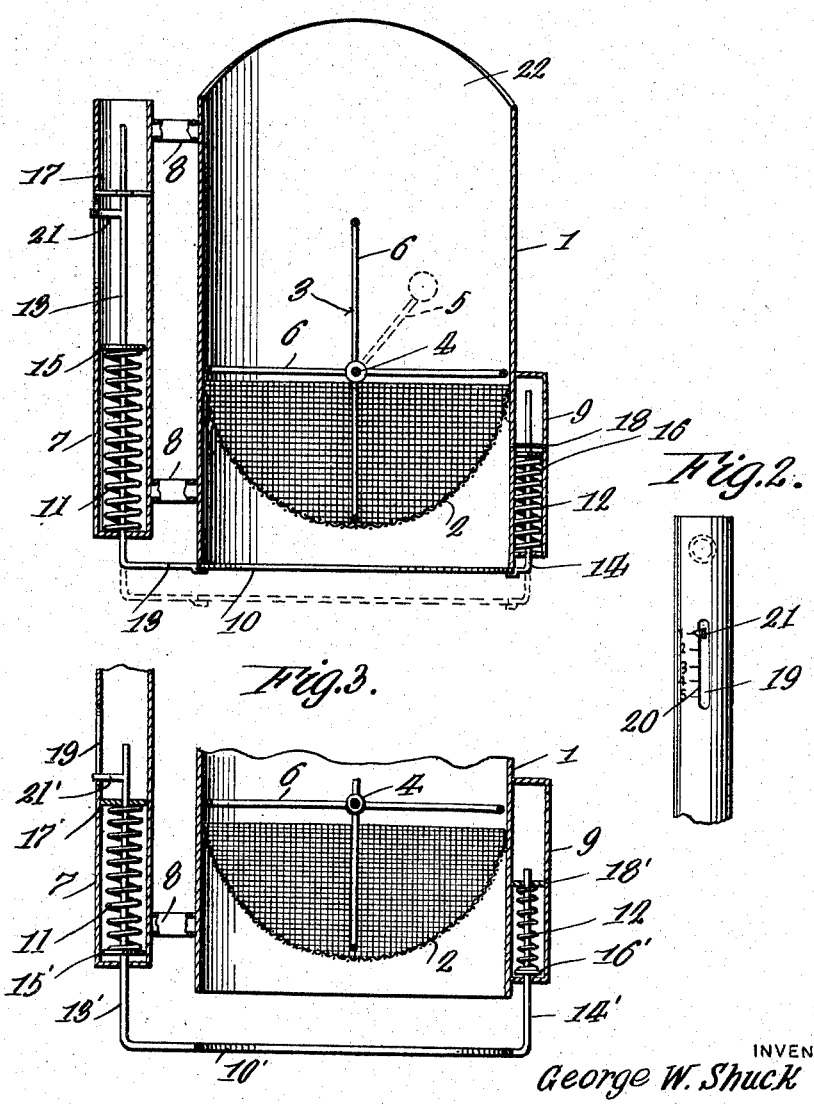

GEORGE W. SHUCK, OF LAWRENCE, KANSAS.

FLOUR SIFTER AND SCALE.

1,308,303.     Specification of Letters Patent.     Patented July 1, 1919.

Application filed July 22, 1918. Serial No. 246,145.

*To all whom it may concern:*

Be it known that I, GEORGE W. SHUCK, a citizen of the United States, residing at Lawrence, in the county of Douglas and State of Kansas, have invented certain new and useful Improvements in Flour Sifters and Scales, of which the following is a specification.

This invention relates to sifters and the object thereof is to provide a simply constructed and efficient sifter for flour and light material which will also weigh the material sifted thereby.

Another object is to provide a sifter of this character the handle of which constitutes one member of the scale mechanism.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a central vertical section of a sifter constructed in accordance with this invention, Fig. 2 is a detail rear elevation of the handle member constituting a portion of the scale, and Fig. 3 is a view similar to Fig. 1, with parts broken out showing a slightly different form of the invention.

The embodiment illustrated in Figs. 1 and 2, which constitutes one form of the invention comprises a cylindrical receptacle 1 composed of sheet tin or any other suitable light weight rigid material. This receptacle is open at both its top and bottom and has near its lower end the usual sieve or screen 2 in the form of a half spheroid.

Adapted to revolve within and to nearly touch the sieve 2 is a beater 3 mounted on a shaft 4 which extends transversely through the cylinder and is mounted to rotate in the side walls thereof, one end of said shaft projecting beyond the cylinder side wall and is provided with a crank handle 5 for rotating the shaft and the beater 3 carried thereby. This beater is composed of a plurality of stirrer arms 6, four of which are here shown, although obviously any desired number may be employed. All of these parts are of ordinary construction such as are found in flour sifters now in use.

A tubular handle 7 extends parallel with the cylindrical receptacle 1 and is connected with one side wall thereof by arms 8 which are here shown arranged near the top and bottom of said handle. This tubular handle 7 is closed at its bottom and open at its top although it may be closed at the top if found desirable. A tubular casing 9 is mounted on and fixed to the receptacle 1 at a point diametrically opposite the handle 7. This casing 9 is of less length than said handle and is shown closed at both its upper and lower ends.

A material supporting plate 10 is arranged below the open lower end of the receptacle 1 and is adapted to move toward and away from said receptacle. This plate 10 as shown, conforms to the shape of the receptacle, being circular, but obviously it may be of other desired configuration. This plate 10 is supported and yieldingly held normally in engagement with the lower end of the receptacle 1 by coiled springs 11 and 12 disposed within the tubular handle 7 and the casing 9 respectively, and which surround rods 13 and 14 which are fixed to the plate 10 and extend upwardly through openings in the bottom of the handle 7 and casing 9, respectively, as is shown clearly in Fig. 1. In the present embodiment, these rods 13 and 14 first extend laterally from the perimeter of plate 10, being fixed thereto by any suitable means and then upwardly through the coiled springs 11 and 12 and have fixed thereto plungers in the form of plates 15 and 16 against which the upper ends of the springs 11 and 12 bear thereby normally forcing the rods upward into the handle 7 and casing 9 as shown in Fig. 1, and thereby seating plate 10 closely against the lower end of receptacle 1.

Guides 17 and 18 extend transversely across the handle 7 and casing 9, respectively, being shown in the form of apertured bars through which said rods extend and by which they are guided and held against lateral movement.

The tubular handle 7 has a longitudinally extending slot 19 arranged in its outer side wall and arranged along one edge thereof is a graduated scale 20 for coöperation with a pointer or finger 21 which projects laterally from the rod 13 through the slot 19 and which operates as an indicator to show the weight of the material carried by plate 10.

In the use of this combined sifter and scale the flour or other material is placed within the cylinder which may have a scoop 22 at one side thereof, if desired, for scooping up the material into the sifter. When the material has been so placed the crank handle 5 is turned to rotate the beater 3 and the material is sifted through the sieve 2 on to plate 10 which under the weight of said material gradually lowers against the tension of springs 11 and 12 and as it lowers the pointer 21 moves downwardly through slot 19 and by means of the scale 20 indicates the weight carried by said plate. When the desired quantity has been sifted on to the plate it may be removed by tilting the receptacle sidewise to discharge it. When the sifted material is discharged the plate will normally return to its raised position against the bottom of receptacle 1 under the action of springs 11 and 12 and the sifter will then be ready for operation again in the manner just described.

In the embodiment illustrated in Fig. 3, which constitutes the preferred form of the invention, the receptacle 1, sieve 2, handle 7 and casing 9 are the same as those shown in Fig. 1. The difference between the two forms consists in the substitution for the plate 10 of an annular member 10' having upstanding rods 13' and 14' slidable respectively in the handle 7 and casing 9 similar to rods 13 and 14 of the other figures.

The rod 13' has a finger 21' which in the normal position of the device before material is placed in the sieve 2 lies in the lower end of slot 19 and the coiled spring 11 in the handle 7 is arranged between guide 17' and plunger 15' and in connection with spring 12 operates to hold the receptacle 1 raised.

In the operation of this form of the invention, material to be sifted is placed in sieve 2 and the weight thereof causes the receptacle to lower, compresses springs 11 and 12 and the position of finger 21' in slot 19 indicates on the scale 20 the weight of the material in the sieve, it being of course understood that ring 10' rests on a non-yielding support.

From the foregoing description taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

Having thus described my invention what I claim as new and desire to secure by Letters Patent, is:—

1. A combined sifter and scale comprising a cylindrical receptacle open at both ends, a sieve arranged in said receptacle, tubular casings carried by said receptacle, a member movable toward and away from the lower end of said receptacle, supporting rods connected with said member and extending into said casings, stops on said rods in said casings, coiled springs surrounding said rods and bearing against said stops to normally hold the member in operative position, and coöperating means carried by one of said rods and one of said casings for indicating the weight of the contents of the receptacle.

2. A combined sifter and scale comprising a cylindrical receptacle open at both ends, a sieve arranged in said receptacle, tubular casings carried by said receptacle, a member movable toward and away from the lower end of said receptacle, supporting rods connected with said member, and extending into said casings, stops on said rods in said casings, coiled springs surrounding said rods and bearing against said stops to normally hold the member in operative position, one of said casings having a longitudinally extending slot with a graduated scale disposed adjacent one side wall thereof on the outer face of said casing, and a finger carried by the rod within the casing and extending through said slot for coöperation with said scale.

3. A combined sifter and scale comprising a cylindrical receptacle open at both ends, a sieve supported within said receptacle, a member movable toward and away from the open lower end of said receptacle and having rods extending laterally and then upwardly therefrom, casings carried by said receptacle and encompassing the upstanding portions of said rods, coiled springs arranged within said casings around said rods, stops carried by said rods against which said springs bear thereby normally exerting their tension to hold said member in operative position, one of said casings having a slot therein with a graduated scale adjacent one side wall thereof, a finger extending laterally from the rod within the casing through said slot and forming a pointer for coöperation with said scale to indicate the weight of the treated material.

4. A combined sifter and scale comprising a receptacle open at both ends with a sieve arranged therein near one end, a pair of casings carried by said receptacle on its outer face at diametrically opposite points, an annular member movable toward and away from the open lower end of said receptacle, rods extending laterally from said member and then upwardly into said casings, plates fixed to said rods within said casings, coiled springs encircling said rods within said casing and bearing at one end against said plates, guides arranged in said casings for holding said rods against lateral movement, one of said casings having a slot extending longitudinally thereof with a scale arranged adjacent one side wall, a finger carried by the rod within said casing and extending through said slot for coöperation with said scale to indicate the weight of the treated material.

5. A combined sifter and scale comprising a cylindrical receptacle open at both ends, a tubular handle arranged parallel with said receptacle and spaced therefrom and secured thereto by laterally extending arms, a casing carried by said receptacle at a point diametrically opposite said handle, an annular member movable toward and away from the lower open end of said receptacle and having rods projecting into said tubular handle and said casing, coiled springs engaging said rods to normally hold said member in operative relation to the receptacle, said handle having a slot extending longitudinally through one side wall with a graduated scale adjacent one wall of said slot, and a pointer carried by the rod within said handle and extending through said slot for coöperation with said scale for indicating the weight of the material in the receptacle.

6. A combined sifter and scale comprising a receptacle open at both ends and having a sieve in its lower end, tubular casings arranged at opposite sides and rigidly connected with said receptacle, a supporting element arranged below said receptacle and having upstanding arms projecting into and slidable in said casings, coiled springs on said arms operable to normally hold the receptacle in elevated position, a laterally extending finger carried by one arm, one of said casings having a slot through which said finger projects.

In testimony whereof I affix my signature in presence of two witnesses.

GEORGE W. SHUCK.

Witnesses:
J. B. WILSON,
ROBERTA CORNELL.

Copies of this patent may be obtained for five cents each, by addressing the "Commissioner of Patents, Washington, D. C."